US010761241B2

(12) United States Patent
Zhu et al.

(10) Patent No.: US 10,761,241 B2
(45) Date of Patent: Sep. 1, 2020

(54) METHODS FOR OPTIMIZING BUNCH DISTANCE OF FRACTURED HORIZONTAL WELLS OF SHALE GAS

(71) Applicant: UNIVERSITY OF SCIENCE AND TECHNOLOGY BEIJING, Beijing (CN)

(72) Inventors: Weiyao Zhu, Beijing (CN); Ming Yue, Beijing (CN); Yuwei Liu, Beijing (CN); Wenchao Liu, Beijing (CN); Yunfeng Liu, Beijing (CN); Debin Kong, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 16/837,078

(22) Filed: Apr. 1, 2020

(65) Prior Publication Data
US 2020/0225384 A1 Jul. 16, 2020

Related U.S. Application Data

(63) Continuation of application No. PCT/CN2020/072815, filed on Jan. 17, 2020.

(30) Foreign Application Priority Data

Feb. 25, 2019 (CN) .......................... 2019 1 0137958

(51) Int. Cl.
*G01V 99/00* (2009.01)
*E21B 49/00* (2006.01)
*E21B 43/26* (2006.01)

(52) U.S. Cl.
CPC ............ *G01V 99/005* (2013.01); *E21B 49/00* (2013.01); *E21B 43/26* (2013.01); *E21B 2200/20* (2020.05)

(58) Field of Classification Search
CPC ....................................................... E21B 43/26
(Continued)

(56) References Cited

U.S. PATENT DOCUMENTS

2017/0260854 A1 9/2017 Jin et al.

FOREIGN PATENT DOCUMENTS

CN 103953323 A 7/2014
CN 105201479 A 12/2015
(Continued)

OTHER PUBLICATIONS

Lu_2015 (Perforation Spacing Optimization for Multi-stage Hydraulic Fracturing in Xujiahe Formation: A Tight Sandstone Formation in Sichuan Basin of China, Environ Earth Sci (2015) 73:5843-5854) (Year: 2015).*

(Continued)

*Primary Examiner* — Brian S Cook
(74) *Attorney, Agent, or Firm* — IPro, PLLC

(57) ABSTRACT

The present disclosure provides a method for optimizing bunch distance of fractured horizontal wells of shale gas, which relates to the technical field of oil exploration. The method comprises first establishing a stress field distribution model for a single fracture; then establishing an induced stress distribution model of segmented single-bunch fracturing for a horizontal well; later establishing an induced stress distribution model of segmented multi-bunch fracturing for a horizontal well; last optimizing fracturing parameters and fracture distance according to the distribution pattern of the induced stress difference.
The method considers the stress barrier, stress interference effects, and the variation of the effective net pressure during the synchronous expansion of fractures, so the calculation model is more in line with the actual working conditions, has higher precision, and can provide more accurate theoretical (Continued)

guidance for the optimization design of segmented multi-bunch fracturing of a horizontal well.

7 Claims, 4 Drawing Sheets

(58) Field of Classification Search
USPC .......................................................... 703/10
See application file for complete search history.

(56) References Cited

FOREIGN PATENT DOCUMENTS

| CN | 105550410 A | | 5/2016 |
|---|---|---|---|
| CN | 105930743 A | * | 9/2016 |
| CN | 106285598 A | | 1/2017 |
| CN | 106650100 A | | 5/2017 |
| CN | 106930743 A | | 7/2017 |
| CN | 106979000 A | | 7/2017 |
| CN | 107045582 A | | 8/2017 |
| CN | 108952691 A | | 12/2018 |
| CN | 109933860 A | | 6/2019 |
| WO | 2016064476 A1 | | 4/2016 |

OTHER PUBLICATIONS

Lan_2017 (An Optimal Design of Cluster Spacing Intervals for Staged Fracturing in Horizontal Shale Gas Wells Based on the Optimal SRVs, Sciencedirect.com Natural Gas Industry B 4 (2017) 364-373). (Year: 2017).*

Fu-ping_2017 (Calculation Model for Induced Stress Considering the Effect of Stress Resistance and Stress Interference in Staged Multi-cluster Fracturing, Mathematic Practice and Recognition; vol. 47 No. 17, Sep. 2017, p. 111-120) (Year: 2017).*

Calculation Model for Induced stress Considering the Effect of stress Resistance and Stress Interference in Staged Multi-cluster fracturing; Fu-ping Feng, Yang Lei, chao-yang Hu, Chi Al, Zhen-yu Liu, Hu-zhen Wang; Mathematic Practice and Rcognition; vol. 47 No. 17, Sep. 2017, p. 111-120.

PCT/C2020/072815 ISR ISA-210 and ISA-237; mailing date Mar. 27, 2020.

* cited by examiner

METHODS FOR OPTIMIZING BUNCH DISTANCE OF FRACTURED HORIZONTAL WELLS OF SHALE GAS

CROSS-REFERENCE TO RELATED APPLICATIONS

The present application claims the benefit of Chinese Patent Application No. Application No. 201910137958.8 filed on Feb. 25, 2019, the contents of which are hereby incorporated by reference.

TECHNICAL FIELD

The present disclosure relates to the technical field of oil exploration and is more particularly concerned with a method for optimizing bunch distance of fractured horizontal wells of shale gas.

BACKGROUND

Shale gas has developed rapidly around the world, and its distribution area is also quite wide, showing the features of great developing potential. At present, shale gas resources have been found in such area as Bohai Gulf, Songliao, and Sichuan in China. According to related prediction and speculation, the total amount of shale gas resources in China would exceed $30 \times 10^{12}$ m$^3$, which has enormous developing potential.

Shale gas reservoirs show the characteristics of low porosity, and the permeability of substrate is quite low. During the exploration of shale gas, fracture is the major technology and plays an important role in the development of shale gas.

SUMMARY

The present disclosure provides a method for optimizing bunch distance of fractured horizontal wells of shale gas, comprising establishing a stress field distribution model for a single fracture; establishing an induced stress distribution model of multi-segment single-bunch fracturing for a horizontal well; establishing an induced stress distribution model of multi-segment multi-bunch fracturing for a horizontal well; calculating the induced stress outside a fracture in a segment adjacent to previous fractured segment; calculating the induced stress between fractures inside a segment; calculating the induced stress outside a fracture in a segment adjacent to next fractured segment; calculating the horizontal induced stress difference of segmented multi-bunch fracturing for a horizontal well; according to the induced stress difference, determining the optimal bunch distance.

According to at least an embodiment of the present disclosure, the stress field distribution model for a single fracture is $$\begin{cases} \sigma_h = p_n \left(1 - \dfrac{\dfrac{a}{2r}}{\sqrt{\left(\dfrac{a}{2r}\right)^2 + \dfrac{1}{4}}} + \dfrac{\dfrac{a}{2r}}{4\left(\sqrt{\left(\dfrac{a}{2r}\right)^2 + \dfrac{1}{4}}\right)^3}\right) \\ \sigma_H = 2p_n v \left(1 - \dfrac{\dfrac{a}{2h}}{\sqrt{\left(\dfrac{a}{2r}\right)^2 + \dfrac{1}{4}}}\right) \end{cases}$$

where $\sigma_h$ is the induced stress in the minimum horizontal geostress direction of a fracture, MPa; $\sigma_H$ is the induced stress in the maximum horizontal geostress direction of a fracture, MPa; $p_n$ is original net pressure in fractures, MPa; $a$ is the distance from the fracture center to a measuring point, m; $r$ is fracture half length, m; $v$ is rock Poisson ratio.

According to at least an embodiment of the present disclosure, the induced stress distribution model of multi-segment single-bunch fracturing for a horizontal well comprises: the actual net pressure inside the fracture of the Nth segment, i.e. effective net pressure $$p_{en}(N) = p_n - \sum_{i=1}^{N-1} \sigma_h^i(N)$$

where $p_{en}(N)$ is the effective net pressure in the fracture of the Nth segment, MPa; $p_n$ is the original pressure in the fracture of the Nth segment, MPa; $\sigma_h^i(N)$ is the induced stress in the minimum horizontal geostress direction generated by the fracturing of the ith segment in the fracture of the Nth segment, MPa.

The horizontal induced stress in the formation around the fracture of the Nth segment is $$\begin{cases} \sigma_h^N = p_{en}(N)\left(1 - \dfrac{\dfrac{a}{2r}}{\sqrt{\left(\dfrac{a}{2r}\right)^2 + \dfrac{1}{4}}} + \dfrac{\dfrac{a}{2r}}{4\left(\sqrt{\left(\dfrac{a}{2r}\right)^2 + \dfrac{1}{4}}\right)^3}\right) \\ \sigma_H^N = 2p_{en}(N)v\left(1 - \dfrac{\dfrac{a}{2r}}{\sqrt{\left(\dfrac{a}{2r}\right)^2 + \dfrac{1}{4}}}\right) \end{cases}$$

where $\sigma_h^N$ is the induced stress in the minimum horizontal geostress direction generated by the fracturing of the Nth segment to the formation around the Nth segment, MPa; $\sigma_H^N$ is the induced stress in the maximum horizontal geostress direction generated by the fracturing of the Nth segment to the formation around the Nth segment, MPa.

After the fracturing of the Nth segment, the total induced stress in the formation around the segment is obtained by superimposing the induced stresses generated by each segment fracture at the point:

$$\begin{cases} \sigma'_h = \sum_{i=1}^{N} \sigma_h^i \\ \sigma'_H = \sum_{i=1}^{N} \sigma_H^i \end{cases}$$

where $\sigma'_h$ is the induced stress in the formation around the segment in the minimum horizontal geostress direction after the fracturing of the Nth segment, MPa; $\sigma'_H$ is the induced stress in the formation around the segment in the maximum horizontal geostress direction after the fracturing of the Nth segment, MPa; $\sigma_h^i$ is the induced stress in the minimum horizontal geostress direction generated by the fracturing of the ith segment to the point, MPa; $\sigma_H^i$ is the induced stress in the maximum horizontal geostress direction generated by the fracturing of the ith segment to the point, MPa.

According to at least an embodiment of the present disclosure, establishing an induced stress distribution model of multi-segment multi-bunch fracturing for a horizontal well comprises calculating the effective net pressure of the first fracture in the segment relative to previous fractured segment, calculating the effective net pressure of each fracture in the segment relative to the left- and right-side formation thereof, and calculating the effective net pressure of the last fracture in the segment relative to next fractured segment.

According to at least an embodiment of the present disclosure, the multiple bunches are three bunches per segment, wherein the three bunches of fractures of the Nth segment are sequentially recorded as fractures $N_1$, $N_2$, and $N_3$, Fracture $N_1$ is the fracture near the previous fractured segment, i.e. the (N−1)th fractured segment, Fracture $N_3$ is the fracture the furthest away from the (N−1)th fractured segment, Fracture $N_2$ is the fracture between fracture $N_1$ and fracture $N_3$.

According to at least an embodiment of the present disclosure, the said multi-segment is segments of natural numbers equal to or greater than 3.

According to at least an embodiment of the present disclosure, the effective net pressure of Fracture $N_1$ relative to the previous fractured segment is $$p_{enl}(N_1) = p_n - \sigma_h^{(n-1)3}(N_1)$$

where $p_{enl}(N_1)$ is the effective net pressure of Fracture $N_1$ relative to the left-side formation thereof, MPa; $\sigma_h^{(N-1)3}(N_1)$ is the induced stress in the minimum horizontal geostress direction generated by the fracture at the third perforated bunch (here take the example of 3 bunches per segment) of the (N−1)th fractured segment to Fracture $N_1$, MPa.

The induced stress generated at any point in this coordinate between Fracture $N_1$ and $N_2$ is $$\begin{cases} \sigma_{enh}(N_1, N_2) = P_n \frac{\sin\beta_{n1}}{2} \left(\frac{2l_{n1}}{r_{n2}}\right)^{\frac{3}{2}} - P_n \left[\frac{r_{n1}\cos\beta_{n1}}{(r_{n1}r_{n2})^{\frac{1}{2}}} - 1\right] \\ \sigma_{enH}(N_1, N_2) = 2\nu P_n \left[\frac{r_{n1}\cos\beta_{n1}}{(r_{n1}r_{n2})^{\frac{1}{2}}} - 1\right] \end{cases}$$

where $\sigma_{enh}(N_1, N_2)$ is the induced stress in the minimum horizontal geostress direction generated by Fracture $N_1$ to Fracture $N_2$, MPa; $\beta_{n1}$ is the angle of Fracture $N_1$ to a point in the right-side formation thereof; $l_{n1}$ is the total length of Fracture $N_1$, m; $r_{n1}$ is the half length of Fracture $N_1$, m; $r_{n2}$ is the half length of Fracture $N_2$, m; $\sigma_{enH}(N_1, N_2)$ is the induced stress in the maximum horizontal geostress direction generated by Fracture $N_1$ to Fracture $N_2$, MPa.

The relationship between Fracture $N_2$ and $N_3$ is $$\begin{cases} \sigma_{enh}(N_2, N_3) = P_n \frac{\sin\beta_{n2}}{2} \left(\frac{2l_{n2}}{r_{n3}}\right)^{\frac{3}{2}} - P_n \left[\frac{r_{n2}\cos\beta_{n2}}{(r_{n2}r_{n3})^{\frac{1}{2}}} - 1\right] \\ \sigma_{enH}(N_2, N_3) = 2\nu P_n \left[\frac{r_{n2}\cos\beta_{n2}}{(r_{n2}r_{n3})^{\frac{1}{2}}} - 1\right] \end{cases}$$

where $\sigma_{enh}(N_2, N_3)$ is the induced stress in the minimum horizontal geostress direction generated by Fracture $N_2$ to Fracture $N_3$, MPa; $\beta_{n2}$ is the angle of Fracture $N_2$ to a point in the right-side formation thereof; $l_{n2}$ is the total length of Fracture $N_2$, m; $r_{n2}$ is the half length of Fracture $N_2$, m; $r_{n3}$ is the half length of Fracture $N_3$, m; $\sigma_{enH}(N_2, N_3)$ the induced stress in the maximum horizontal geostress direction generated by Fracture $N_2$ to Fracture $N_3$, MPa.

The effective net pressure of Fracture $N_3$ relative to the next fractured segment is $$p_{enr}(N_3) = p_n - \sum_{i=1}^{N-1} \sigma_h^{i3}(N_3)$$

where $p_{enr}(N_3)$ is the effective net pressure of Fracture $N_3$ relative to the right-side formation thereof, MPa.

According to at least an embodiment of the present disclosure, the specific calculation of the induced stress outside a fracture in a segment adjacent to previous fractured segment is as follows.

The induced stress outside a fracture inside the Nth segment adjacent to the previous fractured segment is:

$$\begin{cases} \sigma_h^{N_1} = \sum_{i=1}^{N-1} \sigma_h^j + \sigma_h^{N_1}[p_{enl}(N_1)] \\ \sigma_H^{N_1} = \sum_{j=1}^{N-1} \sigma_H^j + \sigma_H^{N_1}[p_{enl}(N_1)] \end{cases}$$

where $\sigma_h^{N_1}$ is the total induced stress at this point in the minimum horizontal geostress direction, MPa; $\sigma_H^{N_1}$ is the total induced stress at this point in the maximum horizontal geostress direction, MPa; $\sigma_h^i$ is the induced stress in the minimum horizontal geostress direction generated by the fracturing of the ith segment to the point, MPa; $\sigma_H^i$ is the induced stress in the maximum horizontal geostress direction generated by the fracturing of the ith segment to the point, MPa; $\sigma_h^{N_1}[P_{enl}(N_1)]$ is the induced stress in the minimum horizontal geostress direction generated by the fracture at the first perforated bunch of the Nth segment to the left-side formation thereof, MPa; $\sigma_h^{N_1}[P_{enl}(N_1)]$ is the induced stress in the maximum horizontal geostress direction generated by the fracture at the first perforated bunch of the Nth segment to the left-side formation thereof, MPa.

The induced stress between fractures of the Nth segment comprises the induced stress between Fracture $N_1$ and $N_2$ $$\begin{cases} \sigma_h^1 = \sum_{i=1}^{N-1} \sigma_h^{i1} + \sigma_{enh}(N_1, N_2) \\ \sigma_H^1 = \sum_{i=1}^{N-1} \sigma_H^{i1} + \sigma_{enH}(N_1, N_2) \end{cases}$$

where $\sigma_h^1$ is the induced stress in the minimum horizontal geostress direction generated between Fracture $N_1$ and $N_2$, MPa; $\sigma_h^{i1}$ is the induced stress in the minimum horizontal geostress direction generated by the fracture at the first perforated bunch of the fractured ith segment to the point, MPa; $\sigma_H^1$ the induced stress in the maximum horizontal geostress direction generated between Fracture $N_1$ and $N_2$, MPa; $\sigma_H^{i1}$ is the induced stress in the maximum horizontal geostress direction generated by the fracture at the first perforated bunch of the ith fractured segment to the point, MPa.

The induced stress between Fracture $N_2$ and $N_3$ is $$\begin{cases} \sigma_h^2 = \sum_{i=1}^{N-1} \sigma_h^{i1} + \sigma_{enh}(N_1, N_2) + \sigma_{enh}(N_2, N_3) \\ \sigma_H^2 = \sum_{i=1}^{N-1} \sigma_H^{i1} + \sigma_{enH}(N_1, N_2) + \sigma_{enH}(N_2, N_3) \end{cases}$$

where $\sigma_h^2$ is the induced stress in the minimum horizontal geostress direction generated between Fracture $N_2$ and $N_3$, MPa; $\sigma_H^2$ is the induced stress in the maximum horizontal geostress direction generated between Fracture $N_2$ and $N_3$, MPa.

The induced stress outside a fracture in the Nth segment adjacent to next fractured segment is $$\begin{cases} \sigma_h^{N_3} = \sum_{i=1}^{N-1} \sigma_h^j + \sigma_h^{N_3}[p_{enr}(N_3)] \\ \sigma_H^{N_3} = \sum_{i=1}^{N-1} \sigma_H^j + \sigma_H^{N_3}[p_{enr}(N_3)] \end{cases}$$

where $\sigma_h^{N_3}$ is the total induced stress in the minimum horizontal geostress direction at the point, MPa; $\sigma_H^{N_3}$ is the total induced stress in the maximum horizontal geostress direction at the point, MPa.

According to at least an embodiment of the present disclosure, the horizontal induced stress difference $\Delta\sigma$ of segmented multi-bunch fracturing for a horizontal well is $\sigma_H = \sigma_H^{N_1} + \sigma_H^1 + \sigma_H^2 + \sigma_H^{N_3}$ $\sigma_h = \sigma_h^{N_1} + \sigma_h^1 + \sigma_h^2 + \sigma_h^{N_3}$ $\Delta\sigma = \sigma_H - \sigma_h$ where $\sigma_h$ is the induced stress in the minimum horizontal geostress direction generated by formation, MPa; $\sigma_H$ the induced stress in the maximum horizontal geostress direction generated by formation, MPa.

According to at least an embodiment of the present disclosure, the position with the maximum induced stress difference is the optimal bunch distance.

The beneficial effects of the technical solution provided in the present disclosure are as follows.

1. According to the analysis of the stress barrier effects and the stress interference effects between fractures, it is found that fractures at different positions are subject to different stress and cannot be calculated simply by stress superposition. The stress of the first bunch of fracture and the last fracture in the segment should be calculated separately, and the stresses at the other bunches can be obtained by superposition.

2. The calculation model for segmented multi-bunch fracturing induced stress that considers the stress barrier, stress interference effects, and the variation of the effective net pressure during the synchronous expansion of fractures is more in line with the actual working conditions, has higher precision, and can provide more accurate theoretical guidance for the optimization design of segmented multi-bunch fracturing of a horizontal well.

BRIEF DESCRIPTION OF FIGURES

The accompanying figures show the exemplary embodiments of the present disclosure and serve to explain the principles of this disclosure along with the description thereof, wherein these accompanying figures provide further understanding of this disclosure and are included in this specification and constitute part of the specification.

DETAILED DESCRIPTION

The disclosure is further described in detail below with reference to the accompanying figures and embodiments. It can be understood that the specific embodiments described herein are only used to explain related content, rather than limiting the disclosure. It should also be noted that, only the parts related to the present disclosure are shown in the figures for the convenience of description.

It should be noted that the embodiments in the present disclosure and the features in the embodiments can be combined with each other without conflict. The disclosure will be described in detail below with reference to the figures and embodiments.

A method for optimizing bunch distance of fractured horizontal wells of shale gas should possess the following two features: 1. a geostress calculation model with appropriately considering existing fractures in formation after fracturing; 2. a set of stimulation method with appropriately calculating reservoir seepage conditions.

The present disclosure provides a method for optimizing bunch distance of fractured horizontal wells of shale gas.

Figure 1:
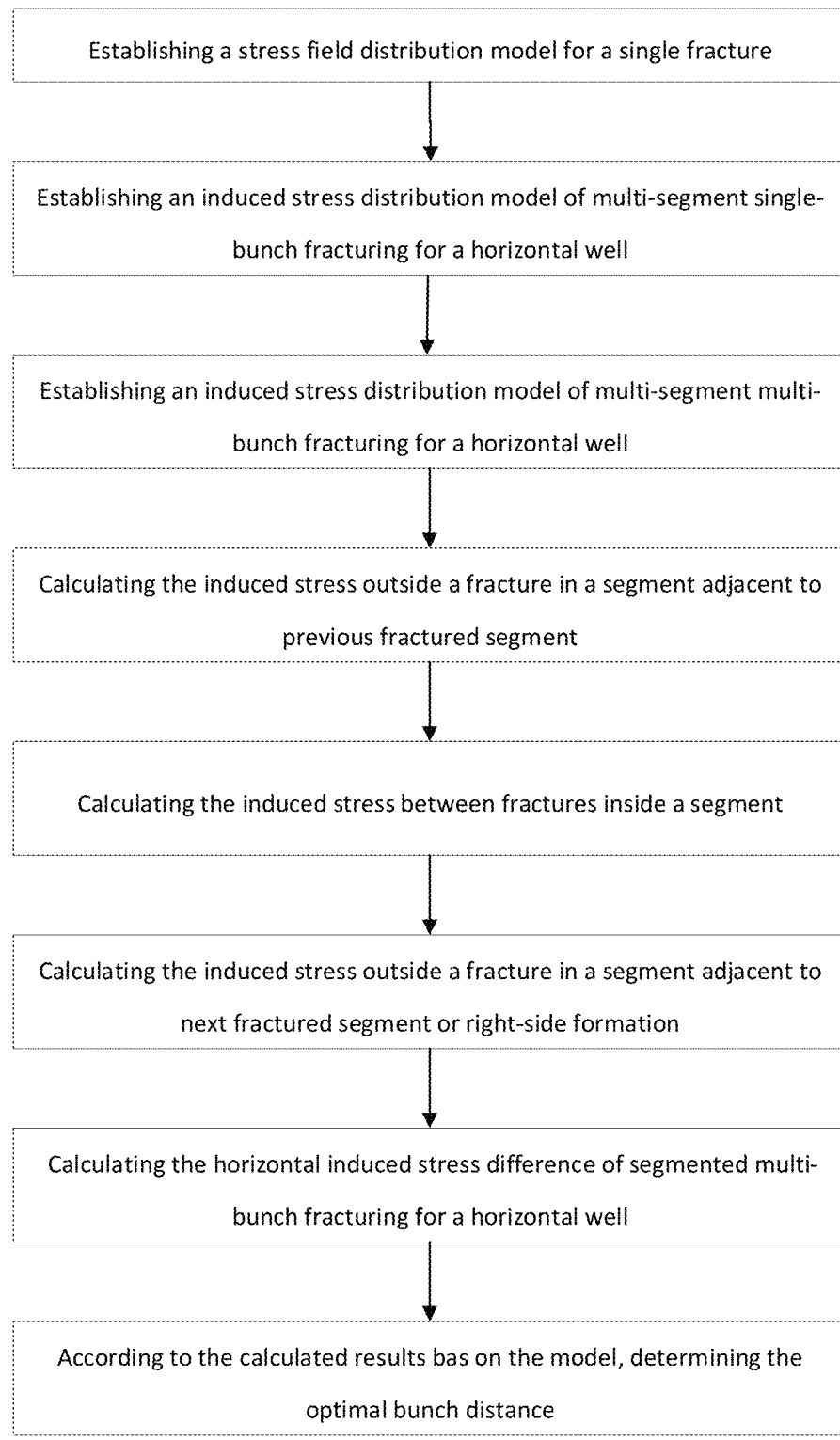
FIG. 1 is the flowchart of the method for optimizing bunch distance of fractured horizontal wells of shale gas according to at least an embodiment of the present disclosure.

As shown in FIG. 1, the method comprises the following steps:

S1: establishing a stress field distribution model for a single fracture, i.e. a mathematical model of horizontal induced stress generated by a single fracture at a point in the horizontal wellbore direction, including the induced stress in the minimum horizontal geostress direction of the fracture and the induced stress in the maximum horizontal geostress direction of the fracture;

S2: establishing an induced stress distribution model of multi-segment single-bunch fracturing for a horizontal well (when a horizontal well is fractured, multiple segments are fractured, and there is only a bunch per segment, which is called multi-segment single bunch);

S3: establishing an induced stress distribution model of multi-segment multi-bunch fracturing for a horizontal well, wherein taking the Nth-segment 3-bunch fracturing as an example, the three fractures of $N_1$, $N_2$, and $N_3$ at the perforated bunch of the Nth segment extend synchronously during fracturing, and since the three fractures of $N_1$, $N_2$, and $N_3$ are not formed in sequence, there are stress barrier and stress interference effects among the three fractures of the Nth fracturing segment;

S4: calculating the induced stress outside a fracture in a segment adjacent to previous fractured segment;

S5: calculating the induced stress between fractures inside a segment;

S6: calculating the induced stress outside a fracture in a segment adjacent to next fractured segment;

S7: calculating the horizontal induced stress difference of segmented multi-bunch fracturing for a horizontal well;

S8: according to the induced stress difference, determining the optimal bunch distance.

The following description will be made in conjunction with specific embodiments.

Figure 2:
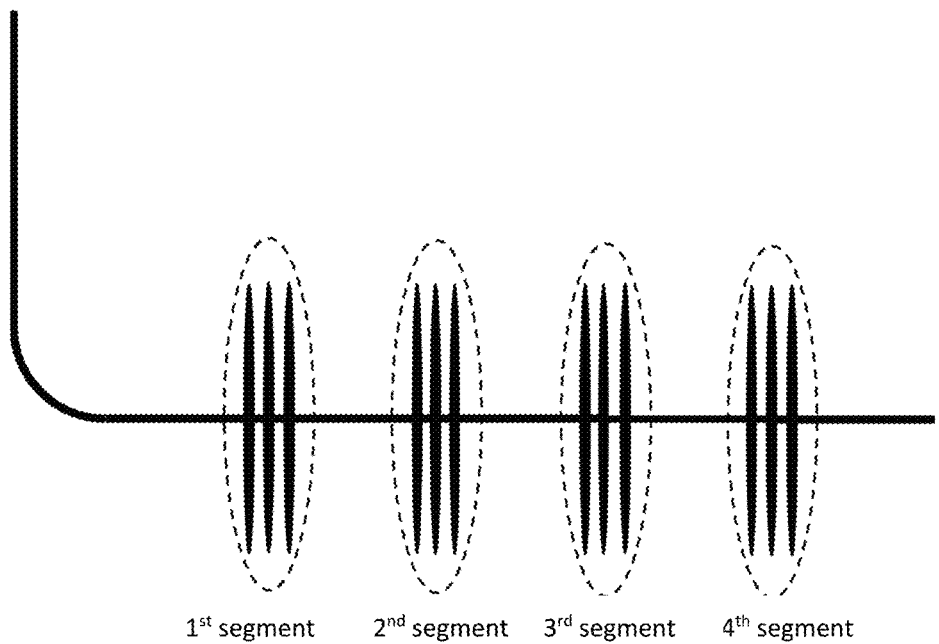
FIG. 2 is a schematic view of bunches of a fractured horizontal well of shale gas according to at least an embodiment of the present disclosure.

FIG. 2 shows a schematic view of shale gas fracturing horizontal well technique. In the figure, the horizontal well has 4 horizontal segments numbered sequentially 1-4 from left to right, and each segment has 3 bunches of fractures.

Step 1: establishing a stress field distribution model for a single fracture.

Figure 3:
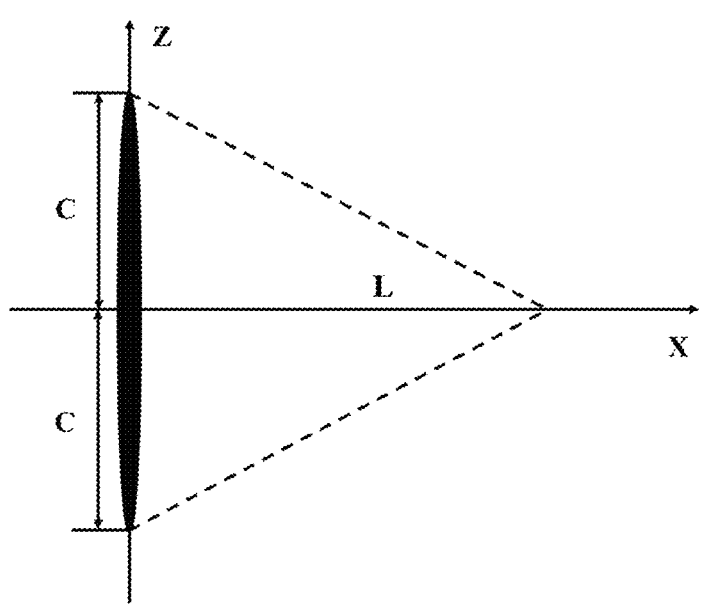
FIG. 3 is a schematic view of the induced stress field geometric distribution of a single fracture according to at least an embodiment of the present disclosure.

The geometrical distribution model of the induced stress field of a single fracture after shale gas fracturing is shown in FIG. 3. It is assumed that the cross section of the fracture is elliptical, the direction of the horizontal wellbore is the x-axis (the minimum horizontal geostress direction), and the direction of the fracture height is the z-axis (the direction perpendicular to the geostress direction). According to the theory of elastic mechanics, the model of horizontal induced stress generated a single fracture to a point on the x-axis at the position of α away from the fracture center is $$\begin{cases} \sigma_h = p_n \left( 1 - \dfrac{\frac{a}{2r}}{\sqrt{\left(\frac{a}{2r}\right)^2 + \frac{1}{4}}} + \dfrac{\frac{a}{2r}}{4\left(\sqrt{\left(\frac{a}{2r}\right)^2 + \frac{1}{4}}\right)^3} \right) \\ \sigma_H = 2 p_n v \left( 1 - \dfrac{\frac{a}{2h}}{\sqrt{\left(\frac{a}{2r}\right)^2 + \frac{1}{4}}} \right) \end{cases} \quad (1)$$

where $\sigma_h$ is the induced stress in the minimum horizontal geostress direction of a fracture, MPa; $\sigma_H$ is the induced stress in the maximum horizontal geostress direction of a fracture, MPa; $p_n$ is original net pressure in fractures, MPa; α is the distance from the fracture center to a measuring point, m; r is fracture half length, m; ν is rock Poisson ratio.

Figure 4:
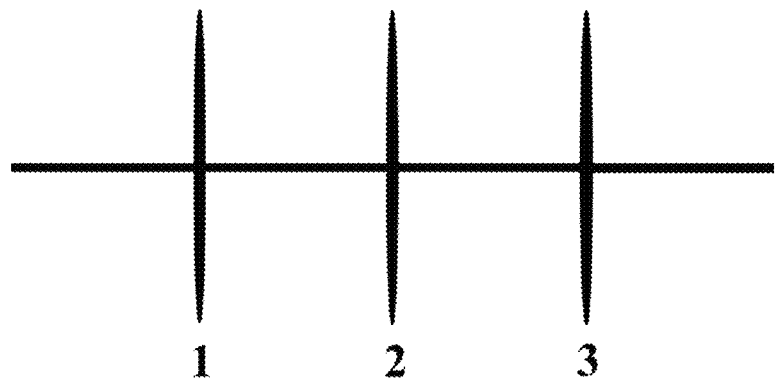
FIG. 4 is a schematic view of segmented single-bunch geometric distribution according to at least an embodiment of the present disclosure.

Step 2: establishing an induced stress distribution model of multi-segment single-bunch fracturing for a horizontal well. When a horizontal well is fractured, multiple segments (N segments) are fractured and there is only a bunch per segment, which is called multi-segment single bunch). FIG. 4 shows a schematic view of a single bunch in 1, 2, 3 segments (only 3 segments are shown), i.e., only one bunch per segment.

However, the actual net pressure in the fracture of the Nth fractured segment, i.e., the effective net pressure is not the original net pressure, but the original net pressure minus the induced stress in the minimum horizontal geostress direction generated by the fractures of the previous N−1 segments at the position of the fracture of the segment, i.e., the expression of the effective net pressure is $$p_{en}(N) = p_n - \sum_{i=1}^{N-1} \sigma_h^i(N) \quad (2)$$

where $p_{en}(N)$ is the effective net pressure in the fracture of the Nth segment, MPa; $p_n$ is the original pressure in the fracture of the Nth segment, MPa; $\sigma_h^i(N)$ is the induced stress in the minimum horizontal geostress direction generated by the fracturing of the ith segment in the fracture of the Nth segment, MPa.

At this point, the horizontal induced stress in the formation around the fracture of the Nth segment is obtained as $$\begin{cases} \sigma_h^N = p_{en}(N) \left( 1 - \dfrac{\frac{a}{2r}}{\sqrt{\left(\frac{a}{2r}\right)^2 + \frac{1}{4}}} + \dfrac{\frac{a}{2r}}{4\left(\sqrt{\left(\frac{a}{2r}\right)^2 + \frac{1}{4}}\right)^3} \right) \\ \sigma_H^N = 2 p_{en}(N) v \left( 1 - \dfrac{\frac{a}{2r}}{\sqrt{\left(\frac{a}{2r}\right)^2 + \frac{1}{4}}} \right) \end{cases} \quad (3)$$

where $\sigma_h^N$ is the induced stress in the minimum horizontal geostress direction generated by the fracturing of the Nth segment to the formation around the Nth segment, MPa; $\sigma_H^N$ is the induced stress in the maximum horizontal geostress direction generated by the fracturing of the Nth segment to the formation around the Nth segment, MPa.

$p_n$ in equation (1) is for a single fracture, that is, the initial condition is that only a fracture is fractured in the reservoir, and the original net pressure is also the effective net pressure. $p_{en}(N)$ in equation (3) is the effective net pressure in the fracture of the Nth segment of segmented single-bunch fracture.

After the fracturing of the Nth segment, the total induced stress in the formation around the segment is obtained by superimposing the induced stresses generated by each segment fracture at the point:

$$\begin{cases} \sigma'_h = \sum_{i=1}^{N} \sigma_h^i \\ \sigma'_H = \sum_{i=1}^{N} \sigma_H^i \end{cases} \quad (4)$$

where $\sigma'_h$ is the induced stress in the formation around the segment in the minimum horizontal geostress direction after the fracturing of the Nth segment, MPa; $\sigma'_H$ is the induced stress in the formation around the segment in the maximum horizontal geostress direction after the fracturing of the Nth segment, MPa; $\sigma_h^i$ is the induced stress in the minimum horizontal geostress direction generated by the fracturing of the ith segment to the point, MPa; $\sigma_H^i$ is the induced stress in the maximum horizontal geostress direction generated by the fracturing of the ith segment to the point, MPa.

Step 3: establishing an induced stress distribution model of multi-segment multi-bunch fracturing for a horizontal well.

Figure 5:
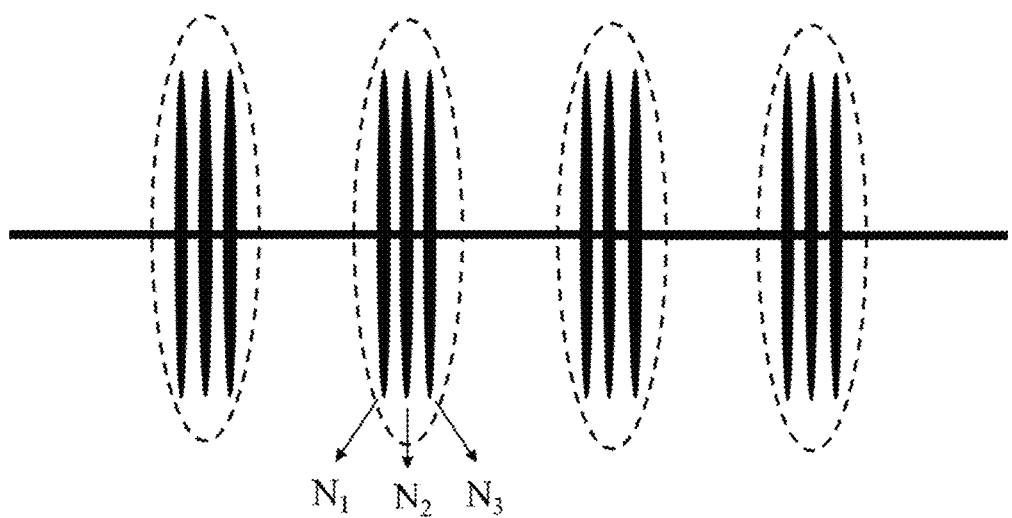
FIG. 5 is a schematic view of segmented multi-bunch geometric distribution according to at least an embodiment of the present disclosure, wherein in the figure is the overall schematic view of 4 segments and 3 bunches.

Taking the fracturing of the Nth segment as an example, the three fractures of $N_1$, $N_2$, and $N_3$ at the perforated bunch of the Nth segment extend synchronously during fracturing. Since the three fractures of $N_1$, $N_2$, and $N_3$ are not formed in sequence, at this moment, there are stress barrier and stress interference effects among the three fractures in the Nth fracturing segment. The morphology of multi-segment multi-bunch fracturing is shown in FIG. 5.

The effective net pressure of Fracture $N_1$ relative to the left formation is:

$$p_{enl}(N_1) = p_n - \sigma_h^{(N-1)^3}(N_1) \quad (5)$$

where $p_{enl}(N_1)$ is the effective net pressure of Fracture $N_1$ relative to the left-side formation thereof, MPa; $\alpha_h^{(N-1)^3}(N_1)$ is the induced stress in the minimum horizontal geostress direction generated by the fracture at the third perforated bunch (here take the example of 3 bunches per segment) of the (N−1)th fractured segment to Fracture $N_1$, MPa.

When the horizontal well fracturing generates fractures, the fractures start fracturing along the direction perpendicular to the direction of the minimum stress and extend along the direction of the maximum major stress. After the distance between segments is fixed, the middle position between two segments is selected as the original point, the x-axis is the direction of the minimum horizontal major stress, the y-axis is the direction of the maximum horizontal major stress, and the cross section through the axis of the horizontal wellbore is selected. In a two-dimensional coordinate system, for the fractures of the ith segment, the induced stress generated at any point of this coordinate between Fracture $N_1$ and $N_2$ is $$\begin{cases} \sigma_{enh}(N_1, N_2) = P_n \frac{\sin\beta_{n1}}{2}\left(\frac{2l_{n1}}{r_{n2}}\right)^{\frac{3}{2}} - P_n\left[\frac{r_{n1}\cos\beta_{n1}}{(r_{n1}r_{n2})^{\frac{1}{2}}} - 1\right] \\ \sigma_{enH}(N_1, N_2) = 2\nu P_n\left[\frac{r_{n1}\cos\beta_{n1}}{(r_{n1}r_{n2})^{\frac{1}{2}}} - 1\right] \end{cases} \quad (6)$$

where $\sigma_{enh}(N_1, N_2)$ is the induced stress in the minimum horizontal geostress direction generated by Fracture $N_1$ to Fracture $N_2$, MPa; $\beta_{n1}$ is the angle of Fracture $N_1$ to a point in the right-side formation thereof; $l_{n1}$ is the total length of Fracture $N_1$, m; $r_{n1}$ is the half length of Fracture $N_1$, m; $r_{n2}$ is the half length of Fracture $N_2$m; $\sigma_{enH}(N_1, N_2)$ is the induced stress in the maximum horizontal geostress direction generated by Fracture $N_1$ to Fracture $N_2$, MPa.

Likewise, the induced stress generated at any point of this coordinate between Fracture $N_2$ and $N_3$ can be obtained as $$\begin{cases} \sigma_{enh}(N_2, N_3) = P_n \frac{\sin\beta_{n2}}{2}\left(\frac{2l_{n2}}{r_{n3}}\right)^{\frac{3}{2}} - P_n\left[\frac{r_{n2}\cos\beta_{n2}}{(r_{n2}r_{n3})^{\frac{1}{2}}} - 1\right] \\ \sigma_{enH}(N_2, N_3) = 2\nu P_n\left[\frac{r_{n2}\cos\beta_{n2}}{(r_{n2}r_{n3})^{\frac{1}{2}}} - 1\right] \end{cases} \quad (7)$$

where $\sigma_{enh}(N_2, N_3)$ is the induced stress in the minimum horizontal geostress direction generated by Fracture $N_2$ to Fracture $N_3$, MPa; $\beta_{n2}$ is the angle of Fracture $N_2$ to a point in the right-side formation thereof; $l_{n2}$ is the total length of Fracture $N_2$, m; $r_{n2}$ is the half length of Fracture $N_2$, m; $r_{n3}$ is the half length of Fracture $N_3$, m; $\sigma_{enH}(N_2, N_3)$ the induced stress in the maximum horizontal geostress direction generated by Fracture $N_2$ to Fracture $N_3$, MPa.

The calculation model for calculating the effective net pressure of the third fracture $N_3$ in the segment relative to the right-side formation thereof is $$p_{enr}(N_3) = p_n - \sum_{i=1}^{N-1} \sigma_h^{i3}(N_3) \quad (8)$$

where $p_{enr}(N_3)$ is the effective net pressure of Fracture $N_3$ relative to the right-side formation thereof, MPa.

Figure 6:
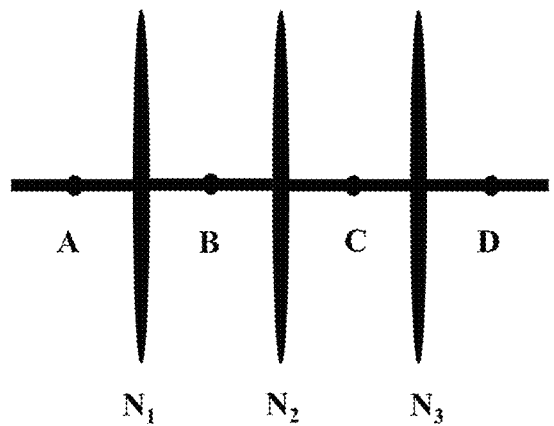
FIG. 6 is a schematic view of 3 bunches in a segment of multiple segments and multiple bunches according to at least an embodiment of the present disclosure.

Step 4: calculating the induced stress outside a fracture in a segment adjacent to previous fractured segment (Point A in FIG. 6). The calculation model is $$\begin{cases} \sigma_h^{N_1} = \sum_{j=1}^{N-1} \sigma_h^j + \sigma_h^{N_1}[P_{enl}(N_1)] \\ \sigma_H^{N_1} = \sum_{i=1}^{N-1} \sigma_H^j + \sigma_H^{N_1}[P_{enl}(N_1)] \end{cases} \quad (9)$$

where $\sigma_h^{N_1}$ is the total induced stress in the minimum horizontal geostress direction at the point, MPa; $\sigma_H^{N_1}$ is the total induced stress in the maximum horizontal geostress direction at the point, MPa; $\sigma_h^i$ is the induced stress in the minimum horizontal geostress direction generated by the fracturing of the ith segment to the point, MPa; $\sigma_H^i$ is the induced stress in the maximum horizontal geostress direction generated by the fracturing of the ith segment to the point, MPa; $\sigma_h^{N_1}[p_{enl}(N_1)]$ is the induced stress in the minimum horizontal geostress direction generated by the fracture at the first perforated bunch in the Nth segment to the left-side formation thereof, MPa; $\sigma_h^{N_1}[p_{enl}(N_1)]$ is the induced stress in the maximum horizontal geostress direction generated by the fracture at the first perforated bunch in the Nth segment to the left-side formation thereof, MPa.

The two parameters above can be obtained according to equation (3).

Step 5: calculating the induced stress between fractures inside a segment (Point B in FIG. 6). The calculation model is $$\begin{cases} \sigma_h^1 = \sum_{i=1}^{N-1} \sigma_h^{i1} + \sigma_{enh}(N_1, N_2) \\ \sigma_H^1 = \sum_{i=1}^{N-1} \sigma_H^{i1} + \sigma_{enH}(N_1, N_2) \end{cases} \quad (10)$$

where $\sigma_h^1$ is the induced stress in the minimum horizontal geostress direction generated between Fracture $N_1$ and $N_2$, MPa; $\sigma_h^{i1}$ is the induced stress in the minimum horizontal geostress direction generated by the fracture at the first perforated bunch in the ith fractured segment to the point, MPa; $\sigma_H^1$ the induced stress in the maximum horizontal geostress direction generated between Fracture $N_1$ and $N_2$, MPa; $\sigma_H^{i1}$ is the induced stress in the maximum horizontal geostress direction generated by the fracture at the first perforated bunch of the ith fractured segment to the point, MPa.

The calculation model for calculating the induced stress between fractures inside a segment (Point C in FIG. 6) is $$\begin{cases} \sigma_h^2 = \sum_{i=1}^{N-1} \sigma_h^{i1} + \sigma_{enh}(N_1, N_2) + \sigma_{enh}(N_2, N_3) \\ \sigma_H^2 = \sum_{i=1}^{N-1} \sigma_H^{ij} + \sigma_{enH}(N_1, N_2) + \sigma_{enH}(N_2, N_3) \end{cases} \quad (11)$$

where $\sigma_h^2$ is the induced stress in the minimum horizontal geostress direction generated between Fracture $N_2$ and $N_3$, MPa; $\sigma_H^2$ is the induced stress in the maximum horizontal geostress direction generated between Fracture $N_2$ and $N_3$, MPa.

S6: calculating the induced stress outside a fracture in a segment adjacent to next fractured segment (Point D in FIG. 6). The calculation model is $$\begin{cases} \sigma_h^{N_3} = \sum_{i=1}^{N-1} \sigma_h^i + \sigma_h^{N_3}[p_{enr}(N_3)] \\ \sigma_H^{N_3} = \sum_{i=1}^{N-1} \sigma_H^j + \sigma_H^{N_3}[p_{enr}(N_3)] \end{cases} \quad (12)$$

where $\sigma_h^{N_3}$ is the total induced stress in the minimum horizontal geostress direction at the point, MPa; $\sigma_H^{N_3}$ is the total induced stress in the maximum horizontal geostress direction at the point, MPa.

Although the embodiment takes three fractures as an example, the method provided by the present disclosure can be similarly applied to conditions of any fractures, and the repetitious details are not given here.

Step 7: calculating the horizontal induced stress difference of segmented multi-bunch fracturing for a horizontal well, wherein the position with the maximum induced stress difference among bunches is the optimal fracture distance. The calculation model is $$\sigma_H = \sigma_H^{N_1} + \sigma_H^1 + \sigma_H^2 + \sigma_H^{N_3} \quad (13)$$

$$\sigma_h = \sigma_h^{N_1} + \sigma_h^1 + \sigma_h^2 + \pi_h^{N_3} \quad (14)$$

$$\Delta\sigma = \sigma_H - \sigma_h \quad (15)$$

where $\sigma_h$ is the induced stress in the minimum horizontal geostress direction generated by formation, MPa; $\sigma_H$ the induced stress in the maximum horizontal geostress direction generated by formation, MPa.

Step 8: according to the induced stress difference, determining the optimal bunch distance. The position with the maximum induced stress difference is the optimal bunch distance. Related curves can be drawn according to the induced stress difference, and the optimal bunch distance can be identified based on the distance between peaks and valleys of the curves.

Figure 7:
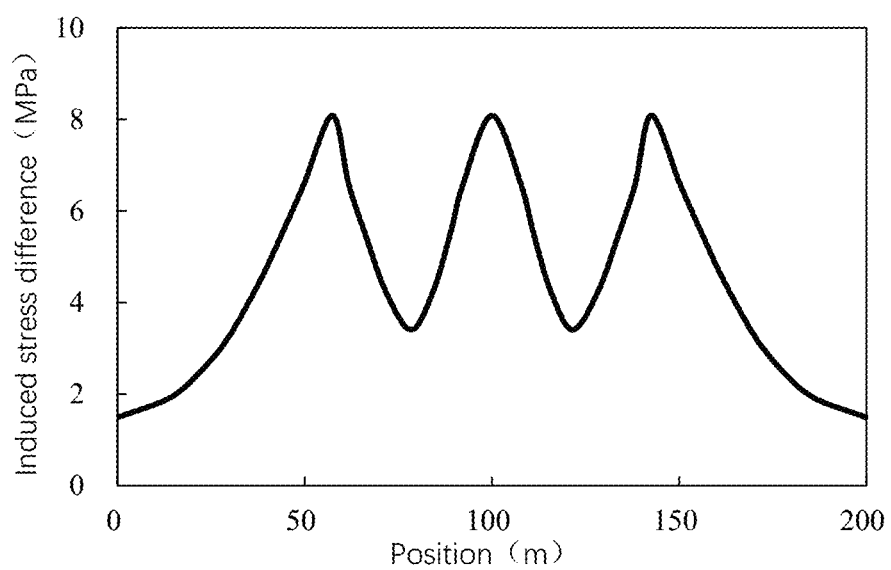
FIG. 7 is the calculation results of induced stress difference according to at least an embodiment of the present disclosure.

As shown in FIG. 7, in the design scheme, the segment length of the horizontal well is 1000 m, and five segments are fractured, i.e. the distance between the center of the segments is 200 m. Taking three bunches in a segment as an example, when the calculated fracture half height is 30 m, the original net pressure is 15 Mpa, and the rock Poisson's ratio is 0.25, the stress diagram obtained based on the optimization method at the present disclosure shows that the optimal bunch distance is that $N_1$ is at 57 m, $N_2$ is at 100 m, and $N_3$ is at 142 m.

The above are preferred embodiments of the present disclosure. It should be noted that without departing from the principles of the present disclosure those skilled in the art can also make several improvements and embroideries, which should also be considered as the scope of the present disclosure.

What is claimed is:

1. A method for optimizing bunch distance of fractured horizontal wells of shale gas, characterized in that, the method comprises
    establishing a stress field distribution model for a single fracture;
    establishing an induced stress distribution model of multi-segment single-bunch fracturing for a horizontal well;
    establishing an induced stress distribution model of multi-segment multi-bunch fracturing for a horizontal well;
    calculating the induced stress outside a fracture in a segment adjacent to a previous segment;
    calculating the induced stress between fractures inside a segment;
    calculating the induced stress outside a fracture in a segment adjacent to a next segment;
    calculating the horizontal induced stress difference of segmented multi-bunch fracturing for a horizontal well; and
    determining a bunch distance, as an optimal bunch distance, at which the horizontal induced stress difference is at a maximum; and
    forming the horizontal well having the optimal bunch distance;
    wherein establishing the induced stress distribution model of multi-segment multi-bunch fracturing for a horizontal well comprises calculating an effective net pressure of the first fracture in the segment relative to the previous segment, calculating an effective net pressure of each fracture in the segment relative to neighboring fractures in the segment, and calculating an effective net pressure of the last fracture in the segment relative to the next segment;
    wherein each segment has three bunches of fractures, wherein the three bunches of fractures of the Nth segment are sequentially recorded as fractures $N_1$, $N_2$, and $N_3$, fracture $N_1$ is the fracture nearest the (N-1)th segment, fracture $N_3$ is the fracture the furthest away from the (N-1)th segment, fracture $N_2$ is the fracture between fracture $N_1$ and fracture $N_3$;
    wherein the effective net pressure of fracture $N_1$ relative to the previous segment is $$P_{eni}(N_1) = P_n - \sigma_h^{(n-1)^3}(N_1)$$

wherein $\sigma_h^{(n-1)^3}(N_1)$ is an induced stress in a minimum horizontal geostress direction generated by the third fracture of the (N-1)th segment to fracture $N_1$;
    wherein the induced stress generated at any point between fracture $N_1$ and fracture $N_2$ is $$\begin{cases} \sigma_{enh}(N_1, N_2) = P_n \frac{\sin\beta_{n1}}{2}\left(\frac{2l_{n1}}{r_{n2}}\right)^{\frac{3}{2}} - P_n\left[\frac{r_{n1}\cos\beta_{n1}}{(r_{n1}r_{n2})^{\frac{1}{2}}} - 1\right] \\ \sigma_{enH}(N_1, N_2) = 2\nu P_n\left[\frac{r_{n1}\cos\beta_{n1}}{(r_{n1}r_{n2})^{\frac{1}{2}}} - 1\right] \end{cases}$$

wherein $\sigma^{enh}(N_1, N_2)$ is the induced stress in the minimum horizontal geostress direction generated by fracture $N_1$ to fracture $N_2$; $\beta_{n1}$ is an angle of fracture $N_1$ to a point in the next segment; $l_{n1}$ is a total length of fracture $N_1$; $r_{n1}$ is a half length of Fracture $N_1$; $r_{n2}$ is a half length of fracture $N_2$; $\sigma_{enH}(N_1, N_2)$ is the induced stress in the maximum horizontal geostress direction generated by fracture $N_1$ to fracture $N_2$;

wherein the relationship between fracture $N_2$ and fracture $N_3$ is $$\begin{cases} \sigma_{enh}(N_2, N_3) = P_n \dfrac{\sin\beta_{n2}}{2} \left(\dfrac{2l_{n2}}{r_{n3}}\right)^{\frac{3}{2}} - P_n \left[\dfrac{r_{n2}\cos\beta_{n2}}{(r_{n2}r_{n3})^{\frac{1}{2}}} - 1\right] \\ \sigma_{enH}(N_2, N_3) = 2\nu P_n \left[\dfrac{r_{n2}\cos\beta_{n2}}{(r_{n2}r_{n3})^{\frac{1}{2}}} - 1\right] \end{cases}$$

wherein $\sigma_{enh}(N_2, N_3)$ is the induced stress in the minimum horizontal geostress direction generated by fracture $N_2$ to fracture $N_3$; $\beta_{n2}$ is an angle of fracture $N_2$ to a point in the next segment; $l_{n2}$ is a total length of fracture $N_2$; $r_{n2}$ is a half length of Fracture $N_2$; $r_{n3}$ is a half length of Fracture $N_3$; $\sigma_{enH}(N_2, N_3)$ the induced stress in the maximum horizontal geostress direction generated by fracture $N_2$ to fracture $N_3$;

wherein the effective net pressure of Fracture $N_3$ relative to the next segment is $$p_{enr}(N_3) = p_n - \sum_{i=1}^{N-1} \sigma_h^{i3}(N_3)$$

wherein $P_{enr}(N_3)$ is the effective net pressure of fracture $N_3$ relative to the next segment.

2. The method according to claim 1, characterized in that, the stress field distribution model for a single fracture is $$\begin{cases} \sigma_h = p_n \left(1 - \dfrac{\frac{a}{2r}}{\sqrt{\left(\frac{a}{2r}\right)^2 + \frac{1}{4}}} + \dfrac{\frac{a}{2r}}{4\left(\sqrt{\left(\frac{a}{2r}\right)^2 + \frac{1}{4}}\right)^3}\right) \\ \sigma_H = 2p_n\nu \left(1 - \dfrac{\frac{a}{2h}}{\sqrt{\left(\frac{a}{2r}\right)^2 + \frac{1}{4}}}\right) \end{cases}$$

wherein $\sigma_h$ is the induced stress in the minimum horizontal geostress direction of a fracture $\sigma_H$ is the induced stress in the maximum horizontal geostress direction of a fracture; $P_n$ is an original net pressure in a fracture; $\alpha$ is the distance from the fracture center to a measuring point; r is a half length of a fracture; $\nu$ is rock Poisson ratio.

3. The method according to claim 1, wherein the effective net pressure of a fracture in the Nth segment is $$p_{en}(N) = p_n - \sum_{i=1}^{N-1} \sigma_h^j(N)$$

wherein $P_n$ is an original pressure in the fracture of the N th segment; $\sigma_h^i(N)$ is the induced stress in the minimum horizontal geostress direction generated by the fracturing of the ith segment in the fracture of the N th segment;

wherein the horizontal induced stress in the formation around the fracture of the N th segment is $$\begin{cases} \sigma_h^N = p_{en}(N)\left(1 - \dfrac{\frac{a}{2r}}{\sqrt{\left(\frac{a}{2r}\right)^2 + \frac{1}{4}}} + \dfrac{\frac{a}{2r}}{4\left(\sqrt{\left(\frac{a}{2r}\right)^2 + \frac{1}{4}}\right)^3}\right) \\ \sigma_H^N = 2p_{en}(N)\nu \left(1 - \dfrac{\frac{a}{2r}}{\sqrt{\left(\frac{a}{2r}\right)^2 + \frac{1}{4}}}\right) \end{cases}$$

wherein $\sigma_h^n$ is the induced stress in the minimum horizontal geostress direction generated by the fracturing of the N th segment to formations around the N th segment $\sigma_H^N$ is the induced stress in the maximum horizontal geostress direction generated by the fracturing of the N th segment to the formations around the N th segment;

wherein after the fracturing of the N th segment, the total induced stress in the formation around the segment is $$\begin{cases} \sigma_h' = \sum_{i=1}^{N} \sigma_h^j \\ \sigma_H' = \sum_{i=1}^{N} \sigma_H^j \end{cases}$$

wherein $\sigma_h'$ is the induced stress in the formation around the segment in the minimum horizontal geostress direction after the fracturing of the N th segment; $\sigma_h'$ is the induced stress in the formation around the segment in the maximum horizontal geostress direction after the fracturing of the N th segment; $\sigma_h^i$ is the induced stress in the minimum horizontal geostress direction generated by the fracturing of the ith segment; $\sigma_H^j$ is the induced stress in the maximum horizontal geostress direction generated by the fracturing of the ith segment.

4. The method according to claim 1, characterized in that, the said multi-segment is segments of natural numbers equal to or greater than 3.

5. The method according to claim 1, characterized in that, the specific calculation of the induced stress outside a fracture in a segment adjacent to previous fractured segment is as follows:

the induced stress outside a fracture inside the N th segment adjacent to the previous fractured segment is:

$$\begin{cases} \sigma_h^{N_1} = \sum_{i=1}^{N-1} \sigma_h^j + \sigma_h^{N_1}[p_{enl}(N_1)] \\ \sigma_H^{N_1} = \sum_{i=1}^{N-1} \sigma_H^j + \sigma_H^{N_1}[p_{enl}(N_1)] \end{cases}$$

wherein $\sigma_h^{N_1}$ is the total induced stress in the minimum horizontal geostress direction; $\sigma_H^{N_1}$ is the total induced stress in the maximum horizontal geostress direction; $\sigma_h^i$ is the induced stress in the minimum horizontal geostress direction generated by the fracturing of the ith segment; $\sigma_H^i$ is the induced stress in the maximum horizontal geostress direction generated by the fracturing of the ith segment; $\sigma_h^{N_1}[P_{enl}(N_1)]$ is the induced stress in the minimum horizontal geostress direction generated by the fracture at the first perforated bunch of the N th segment to the previous fractured segment;

$\sigma_h^{N_1}[P_{enl}(N_1)]$ is the induced stress in the maximum horizontal geostress direction generated by the fracture at the first perforated bunch of the N th segment to the previous fractured segment;

wherein the induced stress between fractures of the N th segment comprises the induced stress between Fracture $N_1$ and $N_2$ $$\begin{cases} \sigma_h^1 = \sum_{i=1}^{N-1} \sigma_h^{i1} + \sigma_{enh}(N_1, N_2) \\ \sigma_H^1 = \sum_{i=1}^{N-1} \sigma_H^{i1} + \sigma_{enH}(N_1, N_2) \end{cases}$$

wherein $\sigma_h^1$ is the induced stress in the minimum horizontal geostress direction generated between Fracture $N_1$ and $N_2$; $\sigma_h^{i1}$ is the induced stress in the minimum horizontal geostress direction generated by the fracture at the first perforated bunch of the ith fractured segment; $\sigma_H^1$ the induced stress in the maximum horizontal geostress direction generated between Fracture $N_1$ and $N_2$; $\sigma_H^{i1}$ is the induced stress in the maximum horizontal geostress direction generated by the fracture at the first perforated bunch of the ith fractured segment;

wherein the induced stress between Fracture $N_2$ and $N_3$ is $$\begin{cases} \sigma_h^2 = \sum_{i=1}^{N-1} \sigma_h^{j1} + \sigma_{enh}(N_1, N_2) + \sigma_{enh}(N_2, N_3) \\ \sigma_H^2 = \sum_{i=1}^{N-1} \sigma_H^{j1} + \sigma_{enH}(N_1, N_2) + \sigma_{enH}(N_2, N_3) \end{cases}$$

wherein $\sigma_h^2$ is the induced stress in the minimum horizontal geostress direction generated between Fracture $N_2$ and $N_3$; $\sigma_H^2$ the induced stress in the maximum horizontal geostress direction generated between Fracture and $N_2$ and $N_3$;

wherein the induced stress outside a fracture in N th segment adjacent to next fractured segment is $$\begin{cases} \sigma_h^{N_3} = \sum_{i=1}^{N-1} \sigma_h^j + \sigma_h^{N_3}[p_{enr}(N_3)] \\ \sigma_H^{N_3} = \sum_{i=1}^{N-1} \sigma_H^j + \sigma_H^{N_3}[p_{enr}(N_3)] \end{cases}$$

wherein $\sigma_h^{N_3}$ is the total induced stress in the minimum horizontal geostress direction at the point; $\sigma_H^{N_3}$ is the total induced stress in the maximum horizontal geostress direction at the point.

6. The method according to claim 5, characterized in that, the horizontal induced stress difference $\Delta\sigma$ of segmented multi-bunch fracturing for a horizontal well is $$\sigma_H = \sigma_H^{N_1} + \sigma_H^1 + \sigma_H^2 + \sigma_H^{N_3}$$

$$\sigma_h = \sigma_h^{N_1} + \sigma_h^1 + \sigma_h^2 + \sigma_h^{N_3}$$

$$\Delta\sigma = \sigma_H - \sigma_h$$

wherein $\sigma_h$ is the induced stress in the minimum horizontal geostress direction generated by formation; $\sigma_H$ the induced stress in the maximum horizontal geostress direction generated by formation.

7. The method according to claim 6, characterized in that, the position with the maximum induced stress difference is the optimal bunch distance.

* * * * *